United States Patent [19]

Steeg

[11] Patent Number: 4,491,211
[45] Date of Patent: Jan. 1, 1985

[54] DIAPHRAGM SPRING FOR FRICTION CLUTCHES OR THE LIKE

[75] Inventor: Klaus Steeg, Bühl, Fed. Rep. of Germany

[73] Assignee: Luk Lamellen und Kupplungsbau GmbH, Bühl, Fed. Rep. of Germany

[21] Appl. No.: 391,461

[22] Filed: Jun. 23, 1982

Related U.S. Application Data

[63] Continuation of Ser. No. 131,942, Mar. 21, 1980, abandoned.

[30] Foreign Application Priority Data

Mar. 24, 1979 [DE] Fed. Rep. of Germany ....... 2911723

[51] Int. Cl.³ .............................................. F16D 13/71
[52] U.S. Cl. .............................. 192/89 B; 192/70.27; 267/161; 267/181
[58] Field of Search ................... 192/89 B, 70.27; 267/161, 181

[56] References Cited

U.S. PATENT DOCUMENTS

| | | | |
|---|---|---|---|
| 2,169,787 | 8/1939 | Becker | 192/70.27 X |
| 2,706,491 | 4/1955 | Kohler | 192/89 B |
| 3,963,105 | 6/1976 | Ernst et al. | 192/98 |

FOREIGN PATENT DOCUMENTS

| | | | |
|---|---|---|---|
| 218801 | 12/1961 | Austria | 192/89 B |
| 2306255 | 8/1973 | Fed. Rep. of Germany | 192/89 B |
| 2543693 | 4/1976 | Fed. Rep. of Germany | . |
| 2539474 | 3/1977 | Fed. Rep. of Germany | 192/89 B |
| 2702201 | 8/1977 | Fed. Rep. of Germany | 89 B/ |
| 2714928 | 10/1978 | Fed. Rep. of Germany | 192/89 B |
| 2311221 | 12/1976 | France | 192/89 B |

Primary Examiner—Rodney H. Bonck
Attorney, Agent, or Firm—Peter K. Kontler

[57] ABSTRACT

An assembly, such as a friction clutch, has a cup spring with a conicity which is variable when the assembly is in use. The cup spring has a ring-shaped base, tongues extending therefrom at an angle and separated from each other by slots which extend radially outwardly and terminate in hole-like cutouts, and hole-like enlargements disposed radially inwardly of the cutouts and having a width greater than the minimal slot width. Holding means extend axially through the cup spring and radially at least into the enlargements to fasten the cup spring in the assembly.

14 Claims, 3 Drawing Figures

DIAPHRAGM SPRING FOR FRICTION CLUTCHES OR THE LIKE

This application is a continuation of application Ser. No. 131,942, filed Mar. 21, 1980, now abandoned.

BACKGROUND OF THE INVENTION

The invention relates to diaphragm or cup springs for assemblies, for instance, friction clutches, with a ring-shaped base and tongues extending therefrom radially or at an angle, especially in an inward direction, and separated from each other by slots which end radially outwardly to hole-like cutouts. Furthermore, the invention relates to assemblies which comprise such cup springs.

In friction clutches of the type disclosed in DE-OS Nos. 2 306 255 and 2 543 693, the configuration of hole-like cutouts through which extend means for holding the cup spring on the clutch cover depends on the form and/or dimensioning of the holding means because the holding means are completely confined in the cutouts. Therefore, possible variations of the forms of cutouts are relatively limited because, generally, the cup spring is also centered by the holding means. For example, an increase in the size of the cutouts, which increases the service life of the cup spring, is possible only to a limited extent because this would necessitate the use of holding means with a correspondingly larger shaft cross-section. In addition to the cost increase due to the enlarged shaft cross-section, a further disadvantage is that such holding means take up a relatively large amount of space and considerably increase the weight of the clutch.

If the holding means were cut out from the cover material, the cover would be weakened to a great extent, whereby the proper functioning of the clutch could be affected.

OBJECTS AND SUMMARY OF THE INVENTION

The instant invention has the objective of avoiding these disadvantages and providing cup springs for assemblies, for instance, friction clutches, which are optimally constructed as concerns their service life, function, and ease of manufacture.

According to the invention, this objective is achieved by providing, radially within the hole-like cutouts, hole-like enlargements with a width exceeding the minimal slot width. The enlargements serve to receive holding means which extend axially through the cup spring and radially at least into the enlargements to fasten the cup spring in the assembly, for example, to the cover of a friction clutch.

The cutouts can be so shaped that the impact tensions in the transition zone between the tongues and the ring-shaped base are considerably reduced, that the service life under dynamic vibrations is increased, and that the allowable load capability at equal vibration stresses is increased, whereby also the service life of assemblies, for example, friction clutches, provided with cup springs of such construction is increased. Hereby, the use of relatively small holding means is made possible in assemblies in which the cutouts are relatively large in any case, for example, in friction clutches for trucks, because cup springs can be centered by the surfaces bounding the enlargements by having the holding means, viewed in radial direction, extend into the enlargements at least partly or be surrounded by the enlargements.

In some cases, it can be of advantage if the holding means are completely contained in the enlargements whereby the centering of the cup springs can be effected by the holding means and by the surfaces bounding the corresponding enlargements.

It can also be of advantage if the hole-like cutouts and the enlargements which are located further inward radially merge into each other directly.

In some cases, it can be useful if, viewed in the radial direction, a constriction is provided between the cutout and the enlargement. This configuration can be especially advantageous in cup springs which are secured to an assembly by holding means having an elongated cross-section, for example, if the elongated cross-section of the holding means extends approximately radially. In this case, the cup spring can be centered, viewed in the circumferential direction, at least by one-sided contact with the surface surrounding the constriction, i.e., with the surface of the enlargement of the tongue at the holding means, whereby one holding means contacts the adjacent tongue at the right side and the other holding means contacts the adjacent tongue at the left side. To avoid weakening the tongues of the cup spring, it is of advantage if the enlargements, viewed in the circumferential direction, are narrower than the cutouts, i.e., if the areas of the enlargements are smaller than the areas of the cutouts.

A particularly advantageous embodiment of a cup spring according to the invention can exhibit the feature that the cutout and the enlargement have the shape of a violin or a violin case. The radially outwardly positioned cutouts may have at least approximately an ellipse-like form with the long axis of the ellipse in the circumferential direction, and the enlargements may have a circular shape, or also an ellipse-like form. The cutout and the enlargement can merge into each other, or they may be separated by a transition zone. This ensures that optimal conditions can be achieved between stresses at the rim of the spring and those due to bending of the tongues.

Another embodiment wherein the hole-like cutouts and the radially inwardly disposed enlargements directly merge into each other is that wherein the cup spring has elliptical cutouts and slot-like enlargements which latter contain holding means having an elongated cross-section and being bent out of the cover. This emodiment is especially advantageous because the deflection stiffness of the tongues is optimal in this case.

A further embodiment features enlargements fitted with flat holding means which, for example, are bent radially out of the cover and point in the circumferential direction with their elongated cross-section.

A further embodiment of the invention relates to a friction clutch in which a cup spring is provided to act upon a pressure plate in a direction toward a friction disc, and the cup spring is fastened to a part of the friction clutch, for instance, its cover, by holding means passing through the cup spring via passage cutouts. According to the invention, the holding means are contained, viewed in the radial direction, at least partly in the passage cutouts. Further hole-like cutouts in communication with the slots separating the individual tongues are provided radially outwardly of the passage cutouts.

It is clear that, in assemblies with cup springs according to the invention, the tilting diameter of the cup spring can be disposed within the diameter which is formed by the outermost contours of the cutouts.

The invention will be further explained with reference to the drawing.

DESCRIPTION OF THE PREFERRED EMBODIMENTS

Figure 1:
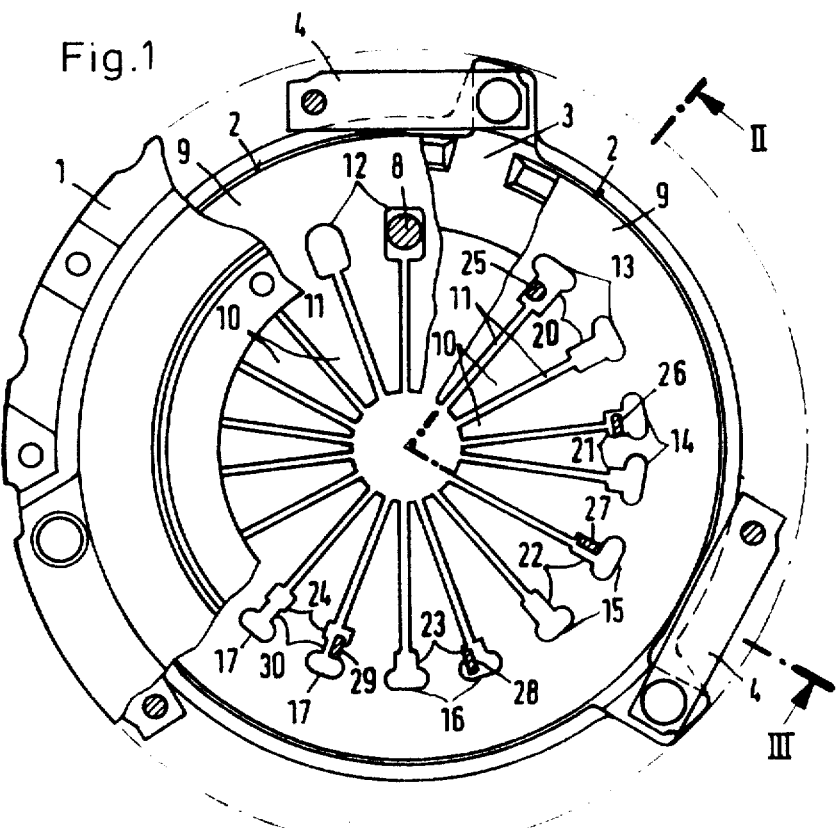
FIG. 1 is an elevational view, partly in section, of a friction clutch which embodies the invention.

Seen from the view of the observer, FIG. 1 shows, beginning at the left, clockwise, a cover 1, a diaphragm or cup spring 2, a pressure plate 3, then again the cup spring 2 and the cover 1. The clutch is provided in a conventional manner with leaf springs 4 for transmitting rotary motion between the cover and the pressure plate.

FIG. 2 shows again the cover 1, the pressure plate 2 and the cup spring 2 whose radially outermost portion is braced against a protrusion 5 of the pressure plate 3 and which is tiltably clamped to the cover between two supports 6 and 7. The fastening of the cup spring 2 to the cover 1 is effected by holding means 8 which secure the support 7 to the cover and extend through the cup spring 2 in the axial direction.

Figure 2:
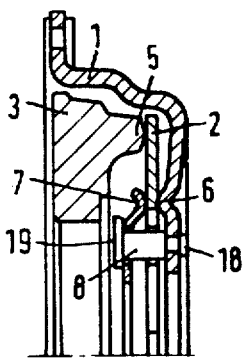
FIG. 2 is a sectional view as seen in the direction of arrow from the line II of FIG. 1.

The left-hand portion of FIG. 1, as well as FIG. 2, show a previously known friction clutch, while the right-hand portion of FIG. 1 shows several embodiments according to the instant invention.

The cup spring 2 has a ring-shaped base, in conventional manner, from which extend radially inwardly directed tongues 10 separated from each other by slots 11 which end radially outwardly in hole-like cutouts. The cutouts 12 shown in the upper portion of FIG. 1 are representative of the present state of the art. The adjacent portion of FIG. 1, viewed clockwise, shows different pairs of holes 13, 14, 15, 16 and 17, and also suitably formed and arranged holding means.

In the friction clutches known up to now, a holding means, here in the form of a shoulder stud 8, is generally provided in every second cutout 12. The studs 8 are riveted to the cover 1 by heads 18 produced in the course of the riveting operation, and their heads 19 carry the support 7 which is in the form of a retaining cup spring.

Because the holding means 8 serve to center the cup spring 2, and the cross-section of the cup spring in the transition zone between the ring-shaped base and a tongue of the cup spring is relatively small, i.e., in the regions of the cutouts, there are limits set to the design of the cup spring with respect to an optimal service life, and thereby limits for achieving an optimal construction ot the clutch.

In the design of a cup spring and a friction clutch according to the invention, the hole-like cutouts 13–17 can be arranged so that the service life of the clutch and cup spring is optimal because hole-like enlargements 20, 21 22, 23, 24 are provided for the passage of the holding means radially inwardly of the hole-like cutouts, whereby the enlargements have greater width than the slots 11 and, viewed in the radial direction, the holding means for securing the cup spring 2 extend at least into these enlargements or are contained in them for the greater part of their radial extension.

The illustrated cutouts and their enlargements have a violin-like or violin case-like shape.

The holding means 25 is also a rivet; however, this rivet can have a smaller cross-section than the rivet 8 which results in a reduction of weight and savings in material.

The holding means 26 is wide, as considered in the circumferential direction, and narrow as considered radially, and is also completely contained in the corresponding hole-like enlargement 21.

The holding means 27 extends more in the radial direction than in the circumferential direction and is almost completely confined in the hole-like enlargement 22, as seen in the radial direction.

Figure 3:
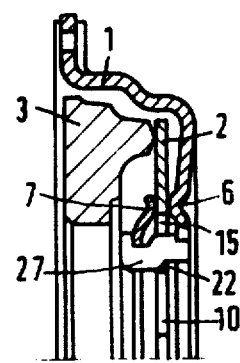
FIG. 3 is a sectional view as seen in the direction of arrow from the line III of FIG. 1.

As shown in FIG. 3, the holding means 27 is stamped out of the material of the cover by a cut approximately in the direction of a chord, and then bent over in the axial direction. The holding means 27 holds the support 7 with a stamped-out hook so that the cup spring 2 is fastened to the cover and clamped tiltably between the two supports.

The other holding means 28 and 29 shown in the drawing can be formed out of the cover in the same manner, and the holding means 26 can also be formed from the material of the cover, but cut in the radial direction and then folded over. The holding means 28 extends only partially into the hole-like enlargement 23 adjacent to the hole-like cutout 16, i.e., it is only partially retained in the enlargement 23.

The holding means 29 is disposed radially outside of the hole-like cutout 17 but extends radially into the hole-like enlargement 24, and there is a transition zone 30 provided between each cutout 17 and the respective enlargement 24. In some cases, it is advantageous if the enlargement 24 and the holding means 29 are so constructed that the holding means are completely contained in the enlargement, as seen in the radial direction.

For centering the cup spring, the arrangement can be such that the holding means 25 to 29, viewed in the circumferential direction, only contact and are tangent to one of the surfaces bounding the enlargements 20–24 or the transition zone 30.

Furthermore, it is shown that the areas of the enlagements are smaller than the areas of the cutouts.

Especially when the holding means are formed from the material of the cover, there can be the additional advantage, if the holding means are arranged, for example, like the holding means 29, that those portions of the cup spring which are in contact with the holding means for centering lie against surfaces where no stamping ridge can rub against the cup spring during tilting of the latter.

I claim:

1. A friction clutch, comprising a clutch cover, a cup spring of variable conicity, said cup spring having a ring-shaped base and tongues extending therefrom and separated from each other by slots which extend outwardly and terminate in hole-like cutouts, said cup spring further having hole-like enlargements disposed inwardly of the hole-like cutouts and having a width exceeding the minimal slot width, and holding means extending axially through the cup spring and radially of the cup spring at least into said enlargements to fasten the cup spring to said clutch cover.

2. A friction clutch according to claim 1, wherein the hole-like cutouts and the respective enlargements merge directly into each other.

3. A friction clutch according to claim 1, wherein said cup spring has transition zones between the cutouts.

4. A friction clutch according to claim 1, wherein the enlargements are narrower than the cutouts, as considered in the circumferential direction of the cup spring.

5. A friction clutch according to claim 1, wherein the area defined by each of the enlargements is smaller than that of the respective cutout.

6. A friction clutch according to claim 1, wherein the entire holding means are confined in the respective enlargements.

7. A friction clutch according to claim 1, wherein each of the cutouts and the respective enlargements have the shape of a violin or violin case.

8. A friction clutch according to claim 1, wherein the tongues extend radially from the ring-shaped base.

9. A friction clutch according to claim 8, wherein the tongues extend radially inwardly from the ring-shaped base.

10. A cup spring for an assembly, for example, a friction clutch, comprising a ring-shaped base and tongues extending therefrom radially or at another angle, especially inwardly, and separated from one another along the full length thereof by slots each having two halves which are at least substantially mirror symmetrical to one another, and said slots terminating radially outwardly in hole-like cutouts which merge directly into hole-like enlargements disposed radially inwardly of the hole-like cutouts and having a width exceeding the minimal width of the slots, the slot portions of minimal width being located radially inwardly of said enlargements, and said enlargements being arranged to confine first portions of holding means which extend axially and radially through the cup spring to fasten the cup spring in the assembly, for example, on the cover of a friction clutch, said cutouts being arranged to confine second portions of such holding means.

11. A cup spring as defined in claim 10, wherein the enlargements are narrower than the hole-like cutouts, as considered in the circumferential direction of the cup spring.

12. A cup spring as defined in claim 10, wherein the areas of the enlargements are smaller than those of the hole-like cutouts.

13. A cup spring as defined in claim 10, wherein the cutouts and the respective enlargements have a shape at least resembling that of a violin or a violin case.

14. A friction clutch, comprising a pressure plate, a friction disc, a cup spring of variable conicity, said cup spring having a ring-shaped base and tongus extending therefrom and separated from each other by slots which extend outwardly and terminate in hole-like cutouts, said cup spring further having hole-like enlargements disposed inwardly of the hole-like cutouts and having a width exceeding the minimal slot width, and holding means extending axially through the cup spring and radially of the cup spring at least into said enlargements to fasten the cup spring to a part of the friction clutch, said cup spring acting upon said pressure plate in a direction toward said friction disc.

* * * * *